United States Patent
Isshiki et al.

(10) Patent No.: US 9,900,146 B2
(45) Date of Patent: Feb. 20, 2018

(54) ENCRYPTED TEXT MATCHING SYSTEM, METHOD, AND COMPUTER READABLE MEDIUM

(71) Applicant: NEC Corporation, Minato-ku, Tokyo (JP)

(72) Inventors: Toshiyuki Isshiki, Tokyo (JP); Kengo Mori, Tokyo (JP); Toshinori Araki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 149 days.

(21) Appl. No.: 14/784,103

(22) PCT Filed: Apr. 23, 2014

(86) PCT No.: PCT/JP2014/061398
§ 371 (c)(1),
(2) Date: Oct. 13, 2015

(87) PCT Pub. No.: WO2014/175320
PCT Pub. Date: Oct. 30, 2014

(65) Prior Publication Data
US 2016/0080142 A1 Mar. 17, 2016

(30) Foreign Application Priority Data
Apr. 24, 2013 (JP) .................................. 2013-091466

(51) Int. Cl.
*H04L 9/00* (2006.01)
*G06F 21/62* (2013.01)
(Continued)

(52) U.S. Cl.
CPC .............. *H04L 9/002* (2013.01); *G06F 21/62* (2013.01); *H04L 9/008* (2013.01); *H04L 9/06* (2013.01);
(Continued)

(58) Field of Classification Search
CPC . H04L 9/002; H04L 9/06; H04L 9/008; H04L 9/3231; H04L 9/3236; G06F 21/62
See application file for complete search history.

(56) References Cited

U.S. PATENT DOCUMENTS

| | | | |
|---|---|---|---|
| 5,926,508 A | * | 7/1999 | Koos ...................... H04L 1/0054 375/242 |
| 2005/0010719 A1 | * | 1/2005 | Slavin .................... G11C 15/00 711/108 |

(Continued)

FOREIGN PATENT DOCUMENTS

| | | |
|---|---|---|
| JP | 2006-158851 A | 6/2006 |
| JP | 2008-502071 A | 1/2008 |

(Continued)

OTHER PUBLICATIONS

Multi-Algorithm Fusion with Template Protection, 2009 IEEE.*

(Continued)

*Primary Examiner* — Saleh Najjar
*Assistant Examiner* — Shu Chun Gao

(57) ABSTRACT

An encrypted text matching system includes: an auxiliary data generating unit that generates first and second auxiliary data, which are for verification of matching between a first encrypted text that is obtained by encrypting input data and is registered with a storage device and a second encrypted text that is obtained by encrypting input data to be matched, the verification being performed by using a Hamming distance between plaintexts; and a matching determining unit that performs one-way conversion on at least part of the second auxiliary data, performs one-way conversion on intermediate data that is generated based on a difference between the first encrypted text and the second encrypted text and on the first auxiliary data, and determines whether a Hamming distance between plaintexts is equal to or less (Continued)

than a predetermined value, the Hamming distance corresponding to the difference between the first and second encrypted text.

8 Claims, 6 Drawing Sheets

(51) Int. Cl.
*H04L 9/06* (2006.01)
*H04L 9/32* (2006.01)
*H04L 9/08* (2006.01)

(52) U.S. Cl.
CPC .......... *H04L 9/3231* (2013.01); *H04L 9/3236* (2013.01); *H04L 9/0841* (2013.01)

(56) References Cited

U.S. PATENT DOCUMENTS

| | | | |
|---|---|---|---|
| 2008/0304657 A1* | 12/2008 | Tuyls | H04L 9/008 380/28 |
| 2009/0006855 A1* | 1/2009 | Tuyls | H04L 9/3218 713/182 |
| 2009/0136040 A1* | 5/2009 | Oishi | H04L 9/3236 380/277 |
| 2010/0014655 A1 | 1/2010 | Chmora et al. | |
| 2010/0214811 A1* | 8/2010 | Franceschini | G11C 15/046 365/49.17 |
| 2010/0268938 A1* | 10/2010 | Resch | H04L 9/0897 713/153 |
| 2010/0329448 A1* | 12/2010 | Rane | H04L 9/008 380/28 |
| 2011/0004607 A1* | 1/2011 | Lokam | G06F 17/30675 707/759 |

FOREIGN PATENT DOCUMENTS

| | | |
|---|---|---|
| WO | 2011/052056 A1 | 5/2011 |
| WO | 2014/010725 A1 | 1/2014 |

OTHER PUBLICATIONS

International Search Report for PCT Application No. PCT/JP2014/061398, dated Aug. 5, 2014.
English translation of Written opinion for PCT Application No. PCT/JP2014/061398.
Pim Tuyls, Anton H. M. Akkermans, Tom A. M. Kevenaar, Geert-Jan Schrijen, Asker M. Bazen and Raimond N. J. Veldhuis, "Practical Biometric Authentication with Template Protection", Proceedings of AVBPA 2005, Lecture Notes in Computer Science, vol. 3546, Springer Verlag, pp. 436-446, 2005. Cited in the Specification.
Toshiyuki Isshiki et al., New security definitions for biometric authentication with template protection: Toward covering more threats against authentication systems, Proceedings of the 12th International Conference of the Biometrics Special Interest Group (BIOSIG 2013), Sep. 2013. English abstract. Cited in ISR. X.

* cited by examiner

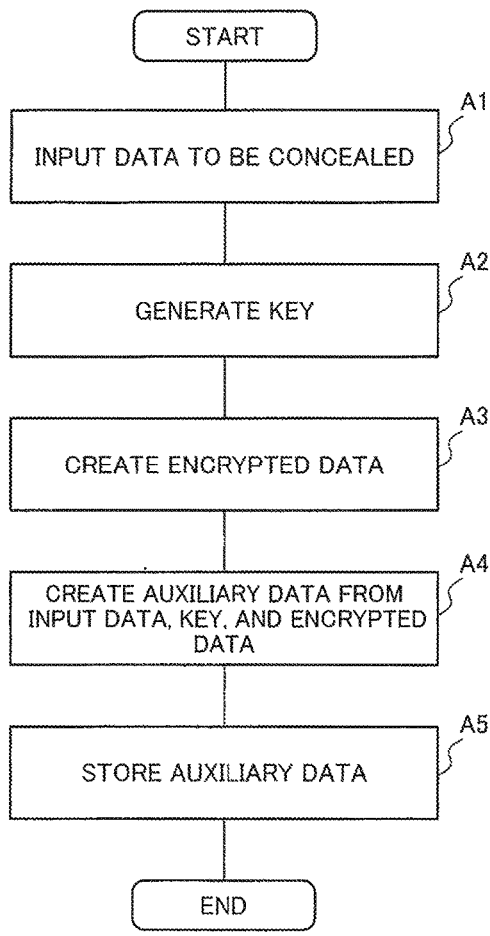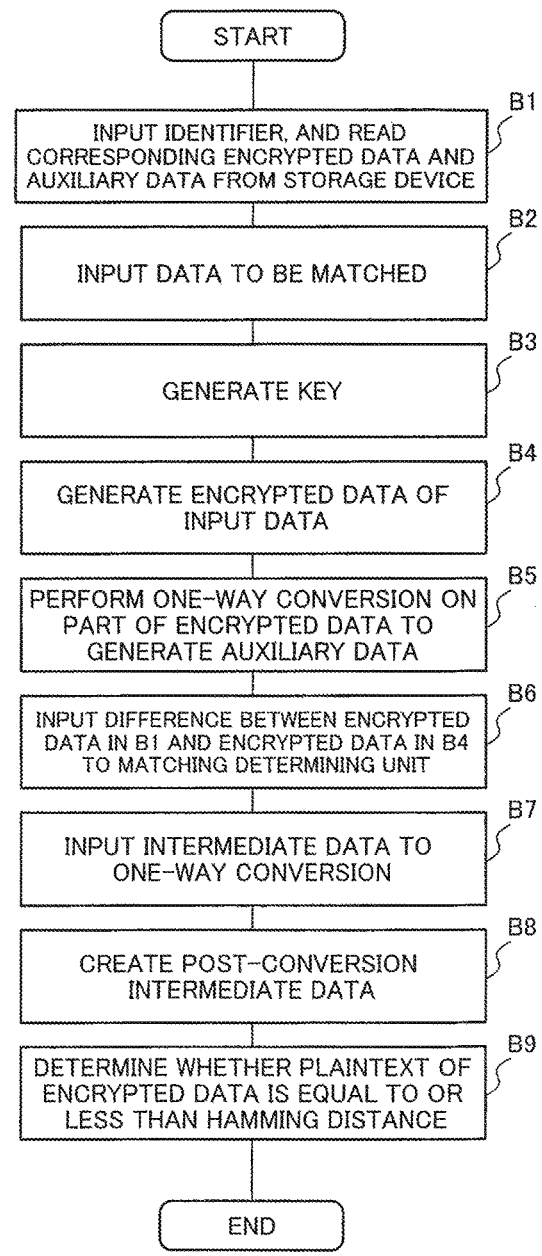

ENCRYPTED TEXT MATCHING SYSTEM, METHOD, AND COMPUTER READABLE MEDIUM

CROSS-REFERENCE TO RELATED APPLICATION

This is a national stage of International Application No. PCT/JP2014/061398 filed Apr. 23, 2014, claiming priority based on Japanese Patent Application No. 2013-091466 (filed on Apr. 24, 2013), the entire content of which is herein incorporated by reference as if fully set forth herein.

The present invention relates to an encrypted text matching system, method, and computer readable medium.

BACKGROUND ART

With the wide-spreading cloud computing, there has recently been a rapid expansion of services based on the user data stored in computational resources connected to networks. Such services more often involve opportunities to deal with sensitive user data. Therefore, it is becoming important to assure users that their data is securely managed. Under such circumstances, research and development are actively promoted for techniques to manage data that remains encrypted in open network environments and to perform searches, statistical processing, and the like on the data without decrypting it.

In addition, crimes are more frequently occurring that exploit the vulnerability of personal authentication using passwords or magnetic cards. Thus, more secure biometric authentication techniques based on biological features such as fingerprints or veins are drawing attention. Biometric authentication requires a template related to biometric information to be stored in a database in order to verify authentication information. Biometric information such as fingerprints or veins is the data that is basically unchanged through one's lifetime. Biometric information requires highest-level security protection because serious damages will occur if such information is leaked. Thus, impersonation or the like must be prevented even when the template is leaked.

Accordingly, it is becoming important to have a template protection type biometric authentication technique which performs authentication with the template information concealed.

For example, PTL 1 discloses a method for performing biometric authentication by representing fingerprint data as points on a polynomial expression, adding random points to the points to conceal the fingerprint data, and using the concealed data as a template.

However, the method of PTL 1 is known to be problematic concerning whether the biometric information still remains protected with adequate strength after biometric authentication is repeated many times.

NPL 1 discloses a method for protecting biometric information by masking a template stored in a database with a random Bose-Chaudhuri-Hocquenghem (BCH) code word. According to NPL 1, biometric information Z and secret information S are used to generate a template for biometric authentication. FIG. 5 is a diagram based on FIG. 2 in NPL 1, with the feature extraction, statistical analysis, quantization, and the like shown in FIG. 2 in NPL 1 omitted. The enrollment of the template is performed as described below.

(1) Input the secret information S to an encoder (ENC), perform error correcting coding (ECC) and generate a code word C. For ECC, binary BCH codes with parameters (K, s, d) are used, where K denotes the length of the code words, s the number of information symbols, and d the number of errors that can be corrected.

(2) Calculate an exclusive OR between C and Z, namely W2=C(+)Z (where (+) represents a bitwise exclusive OR operation (bitwise XOR)).

(3) Input S to a cryptographic (one-way) hash function H, such as Secure Hash Algorithm (SHA)-1 and obtain a hash value H(S).

(4) Store W2 and H(S) as template information in a database (DB).

Verification of whether the template generated through the above steps (1) to (4) and another piece of biometric information Z' have been obtained from the same person is performed as described below.

(1) Calculate an exclusive OR between Z' and W2, namely C'=W2(+)Z'=C(+)(Z(+)Z').

(2) Input C' to a decoder (DEC), perform error-correcting decoding of the BCH code and calculate S'.

(3) Input S' to a cryptographic (one-way) hash function H, such as SHA-1 and calculate a hash value H(S').

(4) Read H(S) from the DB and check whether H(S)=H(S') is satisfied. If H(S)=H(S') is satisfied, it is determined that the template and the biometric information Z' were taken from the same person. If H(S)=H(S') is not satisfied, it is determined that the template and the biometric information Z' were taken from different persons.

The above-described method is not dependent on how the biometric information Z is obtained. Therefore, in general, the method can be regarded as a method for checking whether an encrypted text has been obtained by encrypting data that falls within a certain Hamming distance from the presented data, without decrypting concealed (encrypted) data.

CITATION LIST

Patent Literature

PTL 1: Japanese Unexamined Patent Application Publication No. 2006-158851

Non Patent Literature

NPL 1: Pim Tuyls, Anton H. M. Akkermans, Tom A. M. Kevenaar, Geert-Jan Schrijen, Asker M. Bazen and Raimond N. J. Veldhuis, "Practical Biometric Authentication with Template Protection", Proceedings of AVBPA 2005, Lecture Notes in Computer Science, Vol. 3546, Springer Verlag, pp. 436-446, (2005)

SUMMARY OF INVENTION

Technical Problem

Analyses of related arts are provided below.

A problem of the above-described related arts is that information about a plaintext might be leaked during matching with an encrypted text stored in a database to the administrator or the like who performs the matching. The following describes the reasons.

For example, with regard to PTL 1 above, such leaks might occur due to insufficient concealing strength on encrypted texts.

With regard to NPL 1 above, such leaks might occur because, in order to make it possible to check whether an encrypted text has been obtained by encrypting data that falls within a certain Hamming distance from the presented data, information about a plaintext needs to be transmitted during the checking.

As described above, information about the original plaintext might be leaked when the matching process is carried out repeatedly. Thus, sufficient security cannot be assured if, for example, the database administrator or the like performing the matching process has malicious intent. For example, in view of applications of biometric authentication, a leak of biometric information from the data transmitted during the matching can be regarded as a problem as serious as a leak of biometric information from the registered data. Existing biometric authentication methods that protect templates only address the security against leaks of biometric information from registered templates. However, in order to pay attention to the security of biometric authentication itself, consideration needs to be given to leaks of information from the data transmitted during the matching. In addition, when the security of authentication is taken into consideration, it is a problem that the data transmitted during the matching can be used to generate the data judged as identical to the transmitted data. For example, the method described in NPL 1 allows for the matching by obtaining and retransmitting the value Z'. From the viewpoint of biometric authentication, this conduct means that it is possible to impersonate a person by obtaining the data that was transmitted from the person for his/her authentication.

Accordingly, the present invention has been created in view of the above problems, with an object of providing a system, method, and computer readable medium that can avoid leaks of information about the original plaintext and assure security when performing the matching of encrypted texts.

Solution to Problem

An encrypted text matching system according to the present invention is provided, and the encrypted text matching system includes: an auxiliary data generating unit configured to generate first auxiliary data and second auxiliary data, respectively, which are for verification of matching between a first encrypted text that is obtained by encrypting input data and is registered with a storage device and a second encrypted text that is obtained by encrypting input data to be matched, the verification being performed by using a Hamming distance between plaintexts; and a matching determining unit configured to perform one-way conversion on at least part of the second auxiliary data, perform one-way conversion on intermediate data that is generated based on a difference between the first encrypted text and the second encrypted text and on the first auxiliary data, and determine, by using a result of the one-way conversion performed on the intermediate data as well as using the second auxiliary data that underwent the one-way conversion, whether a Hamming distance between plaintexts is equal to or less than a predetermined certain value, the Hamming distance corresponding to the difference between the first encrypted text and the second encrypted text. According to the present invention, a biometric authentication system including an encrypted text matching system is provided.

In a method for matching encrypted texts according to the present invention, the method includes: generating first auxiliary data and second auxiliary data, respectively, which are for verification of matching between a first encrypted text that is obtained by encrypting input data and is registered with a storage device and a second encrypted text that is obtained by encrypting input data to be matched, the verification being performed by using a Hamming distance between plaintexts; and performing one-way conversion on at least part of the second auxiliary data, performing one-way conversion on intermediate data that is generated based on a difference between the first encrypted text and the second encrypted text and on the first auxiliary data, and determining, by using a result of the one-way conversion performed on the intermediate data as well as using the second auxiliary data that underwent the one-way conversion, whether a Hamming distance between plaintexts is equal to or less than a predetermined certain value, the Hamming distance corresponding to the difference between the first encrypted text and the second encrypted text.

A non-transitory computer readable medium storing a program according to the present invention is provided, and the program causes a computer to execute: a process which generates first auxiliary data and second auxiliary data, respectively, which are for verification of matching between a first encrypted text that is obtained by encrypting input data and is registered with a storage device and a second encrypted text that is obtained by encrypting input data to be matched, the verification being performed by using a Hamming distance between plaintexts; and a process which performs one-way conversion on at least part of the second auxiliary data, performs one-way conversion on intermediate data that is generated based on a difference between the first encrypted text and the second encrypted text and on the first auxiliary data, and determines, by using a result of the one-way conversion performed on the intermediate data as well as using the second auxiliary data that underwent the one-way conversion, whether a Hamming distance between plaintexts is equal to or less than a predetermined certain value, the Hamming distance corresponding to the difference between the first encrypted text and the second encrypted text. According to the present invention, a computer-readable recording medium (magnetic/optical recording medium or semiconductor recording medium) that records the program is provided.

Advantageous Effects of Invention

According to the present invention, it is made possible to avoid leaks of information about an original plaintext and assure security during matching of encrypted texts.

BRIEF DESCRIPTION OF DRAWINGS

FIGS. 2A and 2B are explanatory diagrams describing a data registration phase and an encrypted text matching phase, respectively, according to the exemplary embodiment 1 of the present invention.

DESCRIPTION OF EMBODIMENTS

Embodiments of the present invention will be described. First, the basic concept of the present invention is described below. According to one aspect of the present invention, the input data to be matched is encrypted, while the registered data with which the input data will be matched has been encrypted. In addition, a Hamming distance between plaintexts is used as an indicator (indicator of ambiguity) for determining (verifying) the matching (agreement) between the encrypted input data and the registered encrypted data. In this way, not only the registered encrypted data but also the input data for the matching is encrypted through the use of an encryption method having high concealing strength. When the same input data is used to perform the matching repeatedly, information about a key that is used for concealing the input data is changed every time the matching is performed. Thus, even when the matching is performed repeatedly, the possibility to cause leaks of information about a plaintext can be reduced to a low level. As a result, the present invention contributes to greater resistance to attacks and improved security.

Figure 6:
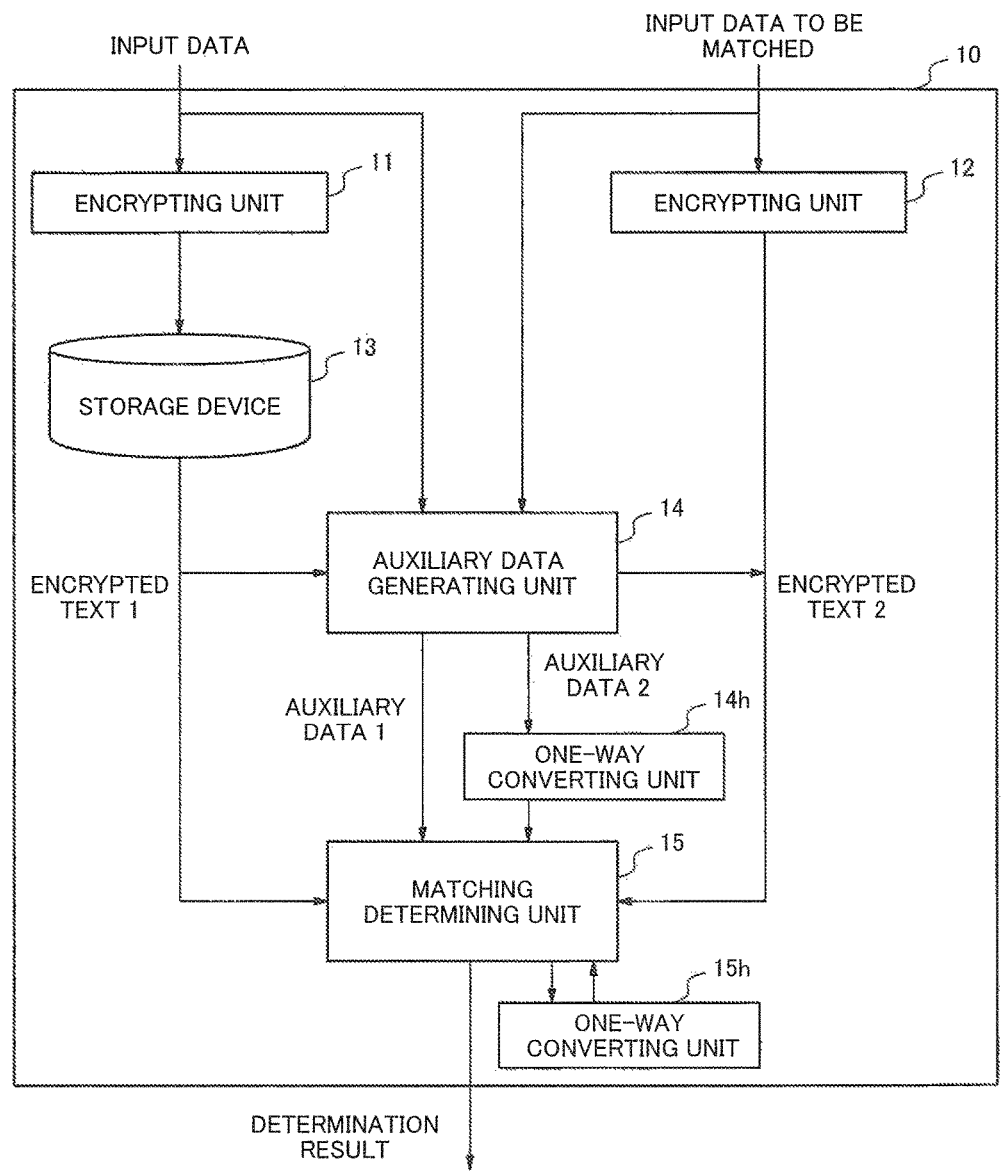
FIG. 6 is an explanatory diagram illustrating the inventive concept.

With reference to FIG. 6, an encrypted text matching system 10 (device) according to one aspect of the present invention includes at least: an auxiliary data generating unit (14) which generates auxiliary data from an encrypted text; and a matching determining unit (15) which makes a determination from the encrypted texts and auxiliary data on the matching between the encrypted input data and the registered encrypted data. The auxiliary data is used for verifying the matching of encrypted texts by using a Hamming distance between plaintexts.

The auxiliary data generating unit (14) generates auxiliary data 1 and auxiliary data 2 on an encrypted text 1 that is produced by an encrypting unit (11) which encrypts the input data and is registered with a storage device unit (13) and on an encrypted text 2 that is produced by an encrypting unit (12) which encrypts the input data to be matched, respectively, the auxiliary data 1 and 2 being required for verifying the matching by using a Hamming distance between plaintexts. The verification of the matching may be, for example, verifying that the Hamming distance between plaintexts of the encrypted text 1 and the encrypted text 2 is equal or less than a predetermined certain value.

At least part of the auxiliary data 2 is subjected to one-way conversion performed by a one-way converting unit (14*h*). Furthermore, intermediate data that is generated based on a difference between the encrypted text 1 and encrypted text 2 and on the auxiliary data 1 is subjected to one-way conversion performed by a one-way converting unit (15*h*).

A matching determining unit (15) determines whether the Hamming distance between plaintexts, which corresponds to the difference between the encrypted text 1 and the encrypted text 2, is equal to or less than a predetermined certain value, by using the result of one-way conversion of the intermediate data performed by the one-way converting unit (15*h*) as well as using the auxiliary data 2, part of which underwent the one-way conversion performed by the one-way converting unit (14*h*). Processes and functions of the individual unit in the encrypted text matching system 10 (device) may be implemented by a program to be executed on a computer constituting the encrypted text matching system 10 (device).

According to the present invention, an encrypted text is a result of an exclusive OR operation between a code word, which is obtained by encoding a key for encrypting the plaintext of the input data with an error-correcting code having linearity, and the plaintext. The first and second auxiliary data related to the encrypted text registered with the storage device and the encrypted text of the input data to be matched may be respectively calculated based on an exclusive OR between an inner product of the key and a constant, and a cryptographic hash function applied to the encrypted text and a random number. A cryptographic hash function has a property called pre-image resistance, which unit given a hash value h it is difficult to find an original character string m such that h=hash(m) (a one-way compression function).

In addition, in order to accomplish the matching between two pieces of encrypted data, which is not achieved by NPL 1 described above, the present invention guarantees that, with respect to a hash function for determining a matching result, it is possible to calculate a hash value of the sum of two pieces of data from their hash values.

As described above, according to the present invention, during the matching process between encrypted texts, the data transmitted by the user who is going to do the matching is also encrypted by an encryption key that is unknown to, for example, the database administrator or the like who performs matching operations. Consequently, leaks of information about the original plaintext can be prevented during the matching process, even when the matching is performed repeatedly or when the database administrator or the like who performs matching operations has malicious intent. Some exemplary embodiments will be described below.

Exemplary Embodiment 1

Figure 1:
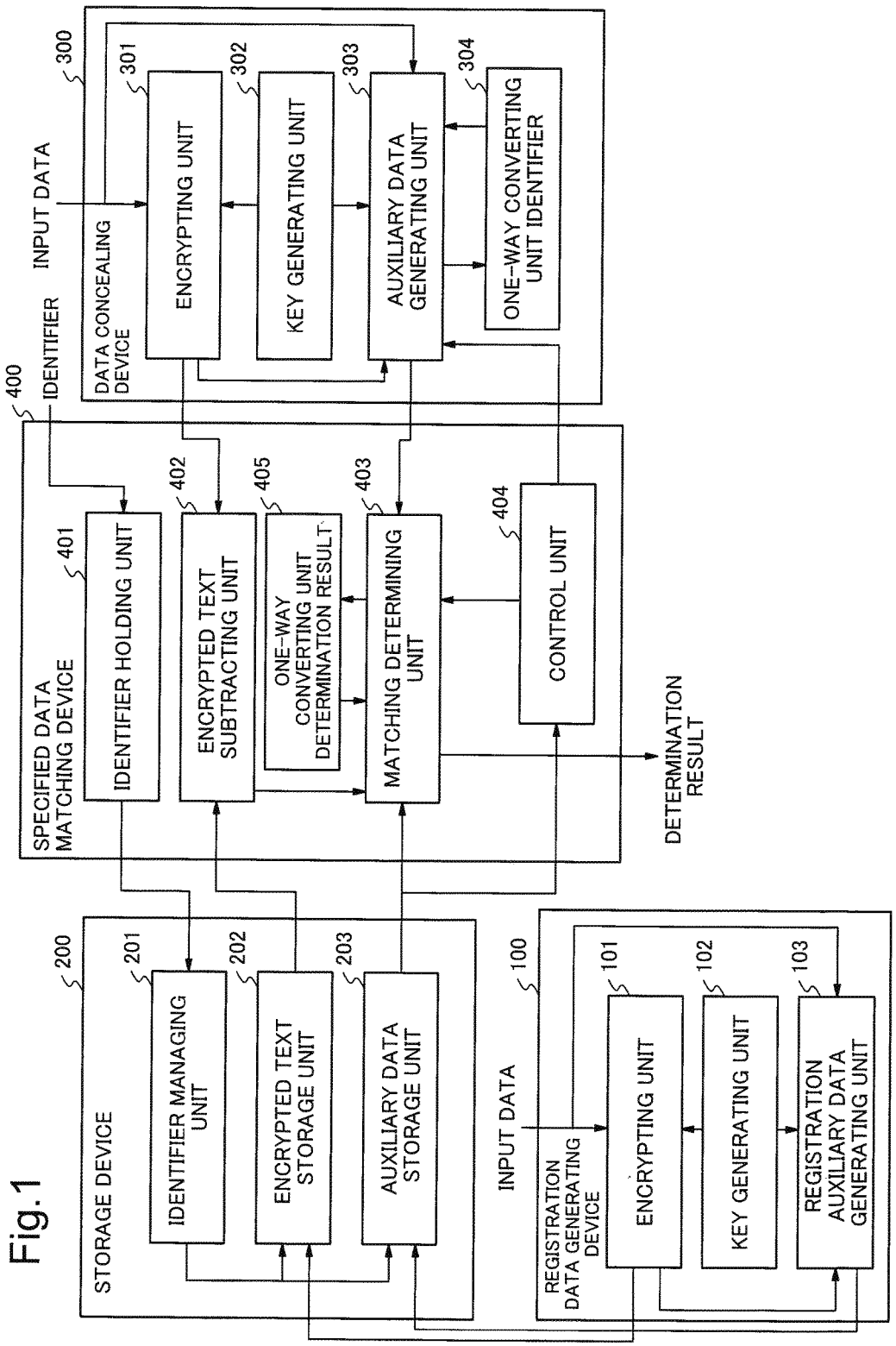
FIG. 1 is a diagram illustrating an example configuration according to an exemplary embodiment 1 of the present invention.

With reference to FIG. 1, a system according to an exemplary embodiment 1 of the present invention includes a registration data generating device 100, a storage device 200, a data concealing device 300, and a specified data matching device 400. Note that these devices may be configured to gather at a single site or the like to form a single apparatus, or may be configured to be distributed and connected to one another via a communication means.

The registration data generating device 100 includes an encrypting unit 101, a key generating unit 102, and a registration auxiliary data generating unit 103.

The encrypting unit 101 receives:
input data to be concealed; and
a key for concealing the input data,
as inputs,
and outputs the encrypted data that is obtained by performing a concealing process on the input data with the key. The encrypted data in the encrypting unit 101 is input to the registration auxiliary data generating unit 103 as well as stored in the storage device 200 (encrypted text storage unit 202).

The key generating unit 102 generates a key to be used for the encrypting unit 101 to conceal the input data, and then outputs the generated key to the encrypting unit 101 and to the registration auxiliary data generating unit 103.

The registration auxiliary data generating unit 103 receives:
input data (input data to be concealed);
encrypted data output from the encrypting unit 101; and
a key output from the key generating unit 102,
as inputs.

The registration auxiliary data generating unit 103 outputs the auxiliary data (registration auxiliary data) for determining whether a Hamming distance between the input data (input data to be matched) corresponding to the encrypted data output from an encrypting unit 301 in the data concealing device 300 and the input data in the encrypting unit 101 is equal to or less than a predetermined certain value (within a certain numerical range).

The encrypted text output from the encrypting unit 101 in the registration data generating device 100 satisfies the following:

let c1 be the encrypted text obtained by encrypting the input data m1 with the key k1; and let c2 be the encrypted text obtained by encrypting the input data m2 with the key k2; then the sum of c1 and c2, c1+c2, is the encrypted text obtained by encrypting the input data m1+m2 with the key k1+k2.

The storage device 200 includes an identifier managing unit 201, an encrypted text storage unit 202, and an auxiliary data storage unit 203.

The encrypted text storage unit 202 and the auxiliary data storage unit 203 respectively receive and store the encrypted data and registration auxiliary data output from the registration data generating device 100. The encrypted text storage unit 202 and the auxiliary data storage unit 203 may be configured as databases (or may be comprised of files).

During the matching of encrypted data, the encrypted text storage unit 202 and the auxiliary data storage unit 203 output to the specified data matching device 400, under the control of the identifier managing unit 201, the encrypted data and auxiliary data corresponding to an identifier input from the specified data matching device 400.

The identifier managing unit 201 in the storage device 200 manages identifiers that uniquely identify encrypted data and auxiliary data input from the registration data generating device 100.

When inputting an identifier from the specified data matching device 400, the identifier managing unit 201 outputs to the encrypted text storage unit 202 and to the auxiliary data storage unit 203 an instruction to respectively output the encrypted data and the auxiliary data corresponding to the input identifier.

The encrypted text storage unit 202 stores the encrypted data output from the encrypting unit 101 in the registration data generating device 100 and, when inputting an instruction to output encrypted data from the identifier managing unit 201, the encrypted text storage unit 202 outputs the corresponding encrypted data.

The auxiliary data storage unit 203 stores the auxiliary data output from the registration auxiliary data generating unit 103 in the registration data generating device 100 and, when inputting an instruction to output encrypted data from the identifier managing unit 201, the auxiliary data storage unit 203 outputs the corresponding auxiliary data.

The data concealing device 300 includes an encrypting unit 301, a key generating unit 302, an auxiliary data generating unit 303, and a one-way converting unit 304.

The encrypting unit 301 receives:

input data to be concealed (input data to be matched); and a key for concealing the input data, as inputs, and outputs the encrypted data that is obtained by performing a concealing process on the input data with the key. The encrypted data output from the encrypting unit 301 is input to the auxiliary data generating unit 303 and to the specified data matching device 400 (encrypted text subtracting unit 402).

The key generating unit 302 generates a key to be used for the encrypting unit 101 to conceal the input data, and then outputs the generated key to the encrypting unit 301 and to the auxiliary data generating unit 303.

The auxiliary data generating unit 303 receives:

the input data (input data to be matched);

encrypted data output from the encrypting unit 301; and a key output from the key generating unit 302 to the encrypting unit 301, as inputs. The auxiliary data generating unit 303 outputs the auxiliary data for determining whether a Hamming distance between the input data (plaintext) corresponding to the encrypted data (registered encrypted data) in the encrypting unit 101 in the registration data generating device 100 and the input data to be matched (plaintext) as input to the encrypting unit 301 is equal to or less than a predetermined certain value (within a certain numerical range). The auxiliary data in the auxiliary data generating unit 303 is input to the specified data matching device 400 (matching determining unit 403).

The one-way converting unit 304 outputs the result of one-way conversion performed on part or all of the data (auxiliary data) generated by the auxiliary data generating unit 303. The auxiliary data is auxiliary information used for determining that the registered encrypted data matches the input data if a Hamming distance between the input data (plaintext) corresponding to the registered encrypted data and the input data to be matched (plaintext) as input to the encrypting unit 301 is not greater than (or is less than) a predetermined value, and for determining that the registered encrypted data does not match (does not agree with) the input data if the Hamming distance is greater than (or no smaller than) a predetermine value. The result of one-way conversion performed by the one-way converting unit 304 is input to the auxiliary data generating unit 303.

The encrypted text output from the encrypting unit 301 in the data concealing device 300 is calculated in the same way as in the encrypting unit 101. That is, the encrypted text satisfies the following:

let c1 be the encrypted text obtained by encrypting the input data m1 with the key k1; and let c2 be the encrypted text obtained by encrypting the input data m2 with the key k2; then the sum of c1 and c2, c1+c2, is the encrypted text obtained by encrypting the input data m1+m2 with the key k1+k2.

The specified data matching device 400 includes an identifier holding unit 401, an encrypted text subtracting unit 402, a matching determining unit 403, a control unit 404, and a one-way converting unit 405.

The identifier holding unit 401 receives an identifier, as an input, and outputs an instruction to the identifier managing unit 201 in the storage device 200 to output the encrypted text data and the auxiliary data that correspond to the identifier in the storage device 200.

The encrypted text subtracting unit 402 receives:

one piece of encrypted data (registered encrypted data) stored in the encrypted text storage unit 202 in the storage device 200; and the encrypted data output from the encrypting unit 301 in the data concealing device 300, as inputs, and outputs a difference c1−c2 between the two pieces of input encrypted data c1 and c2.

Owing to the properties of the encrypting units 101 and 301, the difference c1−c2 is expressed as follows:

let c1 be the encrypted text obtained by encrypting the input data m1 with the key k1; and let c2 be the encrypted text obtained by encrypting the input data m2 with the key k2; then the difference c1−c2 between the two encrypted texts c1 and c2 is the encrypted text obtained by encrypting the input data m1−m2 with the key k1−k2.

The matching determining unit 403 receives:

the auxiliary data stored in the auxiliary data storage unit 203 in the storage device 200;

the auxiliary data output from the auxiliary data generating unit 303 in the data concealing device 300; and the difference between two pieces of encrypted data output from the encrypted text subtracting unit 402, as inputs.

The matching determining unit 403 transmits intermediate data generated from the data that includes at least:

the auxiliary data stored in the auxiliary data storage unit 203 in the storage device 200; and the difference between the two pieces of encrypted data output from the encrypted text subtracting unit 402 to the one-way converting unit 405.

The one-way converting unit 405 returns the data that underwent one-way conversion performed on the intermediate data to the matching determining unit 403.

The matching determining unit 403 determines, based on:

the data generated through one-way conversion performed by the one-way converting unit 405 based on the intermediate data; and one piece of the auxiliary data generated through one-way conversion as output from the auxiliary data generating unit 303 in the data concealing device 300 whether the Hamming distance between plaintexts m1 and m2 which respectively correspond to the encrypted data c1 and c2 as input to the encrypted text subtracting unit 402 is equal to or less than a predetermined certain value, and outputs the determination result.

The control unit 404 controls communications and the like for exchanging data between the data concealing device 300 and the specified data matching device 400.

Operations of the exemplary embodiment 1 will be described with reference to the flowchart in FIGS. 2A and 2B. Operations of the encrypted text matching system according to the exemplary embodiment 1 are broadly divided into two phases: a data registration phase and an encrypted text matching phase.

In the data registration phase, input data is input to the registration data generating device 100, encrypted, and registered with the storage device 200 along with auxiliary data (FIG. 2A).

In the encrypted text matching phase, the input data in the data concealing device 300 is encrypted, and then it is determined whether the encrypted data and auxiliary data, as generated in the encryption process, represent plaintexts that are close to the encrypted data and auxiliary data that are stored in the storage device and are specified by an identifier to be separately input (FIG. 2B). Note that "plaintexts that are close to" means that a Hamming distance is equal to or less than a predetermined certain value.

In the data registration phase, first, the input data to be concealed is input to the encrypting unit 101 in the registration data generating device 100 (Step A1 in FIG. 2A).

Next, the key generating unit 102 in the registration data generating device 100 generates a key to be used for concealing the input data and outputs the key to the encrypting unit 101 and to the registration auxiliary data generating unit 103 (Step A2 in FIG. 2A).

Next, the encrypting unit 101 in the registration data generating device 100 calculates encrypted data that is obtained by encrypting the input data using the input data and the key, and then stores the encrypted data into the encrypted text storage unit 202 (Step A3 in FIG. 2A).

Next, the input data in Step A1, the key generated in Step A2, and the encrypted data generated in Step A3 are input to the registration auxiliary data generating unit 103, and then auxiliary data (registration auxiliary data) is created in the registration auxiliary data generating unit 103 (Step A4 in FIG. 2A).

The registration auxiliary data generating unit 103 stores the created auxiliary data (registration auxiliary data) into the auxiliary data storage unit 203 in the storage device 200 (Step A5 in FIG. 2A).

When the above operations are completed, the input data in the storage device 200 can be assigned a unique identifier by the identifier managing unit 201 and can be later retrieved (read) with the assigned identifier.

In the encrypted text matching phase, first, an identifier is input to the identifier holding unit 401 in the specified data matching device 400, and then the encrypted data (registered encrypted data) corresponding to the input identifier is input to the encrypted text subtracting unit 402 from the encrypted text storage unit 202 in the storage device 200. In addition, the auxiliary data corresponding to the input identifier is input to the matching determining unit 403 from the auxiliary data storage unit 203 (Step B1 in FIG. 2B).

Next, input data (data to be matched) is input to the encrypting unit 301 in the data concealing device 300 (Step B2 in FIG. 2B).

Next, the key generating unit 302 in the data concealing device 300 generates a key to be used for concealing the input data and outputs the created key to the encrypting unit 301 and to the auxiliary data generating unit 303 (Step B3 in FIG. 2B).

Next, the encrypting unit 301 in the data concealing device 300 calculates encrypted data that is obtained by encrypting the input data using the input data in Step B2 and the key in Step B3, and then inputs the encrypted data into the encrypted text subtracting unit 402 in the specified data matching device 400 (Step B4 in FIG. 2B).

The auxiliary data generating unit 303 in the data concealing device 300 creates auxiliary data based on the encrypted data from the encrypting unit 301 as well as on the key from the key generating unit 302. During this process, at least part of the data is subjected to one-way conversion performed by the one-way converting unit 304 to generate the auxiliary data (Step B5 in FIG. 2B).

The specified data matching device 400 receives, as inputs, the encrypted data from the encrypted text storage unit 202 in the storage device 200 and the encrypted data from the encrypting unit 301 in the data concealing device 300. The encrypted text subtracting unit 402 in the specified data matching device 400 outputs the difference between the two input pieces of encrypted data to the matching determining unit 403 (Step B6 in FIG. 2B). In addition, the auxiliary data from the auxiliary data storage unit 203 and the auxiliary data from the auxiliary data generating unit 303 are input to the matching determining unit 403, through communications in concert between the auxiliary data storage unit 203 in the storage device 200 and the auxiliary data generating unit 303 in the data concealing device 300 under the control of the control unit 404.

The matching determining unit 403 in the specified data matching device 400 receives, as an input, the difference between the two pieces of encrypted data output from the encrypted text subtracting unit 402 in the specified data matching device 400 in Step B6 above, as well as receiving, as inputs, the post-conversion auxiliary data from the auxiliary data storage unit 203 and the auxiliary data from the auxiliary data generating unit 303. The matching determining unit 403 in the specified data matching device 400 generates intermediate data from the difference between the two pieces of encrypted data and from the auxiliary data, and outputs the intermediate data to the one-way converting unit 405 in the specified data matching device 400 (Step B7 in FIG. 2B).

The one-way converting unit 405 in the specified data matching device 400 creates post-conversion intermediate data produced through one-way conversion performed on the intermediate data, and outputs the post-conversion intermediate data to the matching determining unit 403 (Step B8 in FIG. 2B).

The matching determining unit 403 in the specified data matching device 400 determines, from the post-conversion intermediate data and the auxiliary data, whether the Hamming distance between:

the plaintext of the registered encrypted data in the encrypted text subtracting unit 402 from the storage device 200 in Step B1; and the plaintext of the encrypted data in the encrypted text subtracting unit 402 in Step B4 is equal to or less than a predetermined certain value and outputs the determination result (Step B9 in FIG. 2B)

Note that the devices 100, 200, 300, and 400 shown in FIG. 1 may be implemented on a single computer system, or may be configured as individual devices. Alternatively, the units in each of the devices 100, 200, 300, and 400 may be configured in the form of individual devices. Processes handled by individual units in individual devices shown in FIG. 1 may be implemented by a program to be executed by a computer. According to the present invention, a recording medium (semiconductor memory or a magnetic/optical disk) that records such program is provided.

The exemplary embodiment 1 makes it possible to prevent leaks of the input data to be matched by applying one-way conversion to the auxiliary data that is related to the input data to be matched.

Exemplary Embodiment 2

An exemplary embodiment 2 of the present invention will be described. In the encrypted text matching system according to the above-described exemplary embodiment 1, input data and an identifier are input to the system, and the input data is matched with the plaintext of the encrypted data corresponding to the identifier. In contrast, according to the present exemplary embodiment, input data is only input to the system, which outputs an identifier corresponding to the encrypted data to be matched with the input data.

Figure 3:
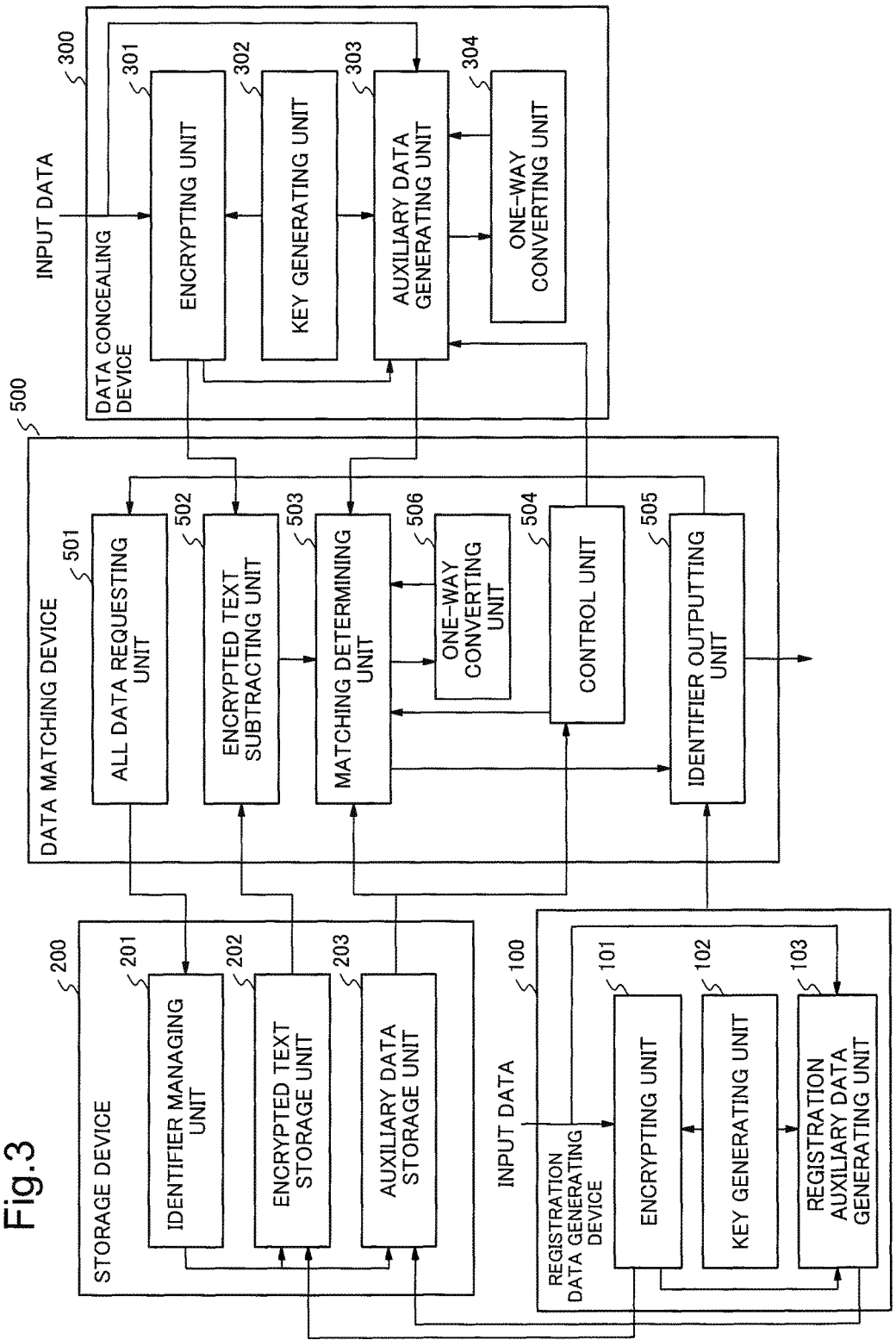
FIG. 3 is a diagram illustrating an example configuration according to an exemplary embodiment 2 of the present invention.

With reference to FIG. 3, the system according to the exemplary embodiment 2 is composed of a registration data generating device 100, a storage device 200, a data concealing device 300, and a data matching device 500. While the registration data generating device 100, the storage device 200, and the data concealing device 300 are configured in the same way as in the exemplary embodiment 1, the configuration of the data matching device 500 is different from that of the exemplary embodiment 1. The following description of the exemplary embodiment 2 focuses on the differences, omitting portions common to the exemplary embodiment 1 as may be appropriate.

The data matching device 500 includes an all data requesting unit 501, an encrypted text subtracting unit 502, a matching determining unit 503, a control unit 504, an identifier outputting unit 505, and a one-way converting unit 506.

In accordance with an instruction given by the identifier outputting unit 505, the all data requesting unit 501 inputs into the identifier managing unit 201 an instruction for sequentially reading every piece of data stored in the storage device 200.

The encrypted text subtracting unit 502 receives, as inputs, one piece of the encrypted data stored in the encrypted text storage unit 202 in the storage device 200 and the encrypted data output from the encrypting unit in the data concealing device 300, and then outputs a difference, c1−c2, between the two pieces of input encrypted data c1 and c2.

Owing to the properties of the encrypting units 101 and 301, the difference c1−c2 is expressed as follows:

let c1 be the encrypted text obtained by encrypting the input data m1 with the key k1; and let c2 be the encrypted text obtained by encrypting the input data m2 with the key k2; then the difference c1−c2 between the two encrypted texts c1 and c2 is the encrypted text obtained by encrypting the input data m1-m2 with the key k1−k2.

The matching determining unit 503 receives:

the auxiliary data stored in the auxiliary data storage unit 203 in the storage device 200;

the auxiliary data output from the auxiliary data generating unit 303 in the data concealing device 300; and the difference between two pieces of encrypted data output from the encrypted text subtracting unit 502, as inputs.

The matching determining unit 503 transmits intermediate data generated from the data that includes at least:

the difference between the two pieces of encrypted data output from the encrypted text subtracting unit 502; and the auxiliary data stored in the auxiliary data storage unit 203 in the storage device 200 to the one-way converting unit 506.

The matching determining unit 503 outputs a determination, based on:

the data generated through one-way conversion performed by the one-way converting unit 506 based on the intermediate data; and one piece of the auxiliary data generated through one-way conversion as output from the auxiliary data generating unit 303 in the data concealing device 300 of whether the Hamming distance between plaintexts m1 and m2, which respectively correspond to the encrypted data c1 and c2, as input to the encrypted text subtracting unit 502 is equal to or less than a predetermined certain value.

The control unit 504 controls communications for exchanging data between the data concealing device 300 and the data matching device 500.

The identifier outputting unit 505 receives:

the identifier for which the identifier managing unit 201 has issued an instruction to the encrypted text storage unit 202 and the auxiliary data storage unit 203 to output the corresponding data; and the matching result output from the matching determining unit 503, as inputs, and, if the matching determining unit 503 determines that there is a match (agreement), outputs the identifier that has been input from the identifier managing unit 201.

Operations according to the exemplary embodiment 2 will be described with reference to the flowchart in FIG. 4. The operations are broadly divided into two phases: a data registration phase and an encrypted text matching phase. In the data registration phase, input data is input to the registration data generating device 100, encrypted, and registered with the storage device 200 along with auxiliary data. In the encrypted text matching phase, the input data to the data concealing device 300 is encrypted and then an identifier is output, the identifier being corresponding to the encrypted data stored in the storage device 200 that represents a plaintext being close (whose Hamming distance is small) to the encrypted data and the auxiliary data generated in the encryption process.

Operations in the data registration phase are the same as those described for the exemplary embodiment 1 with reference to FIG. 2A, and thus their descriptions are omitted here.

Figure 4:
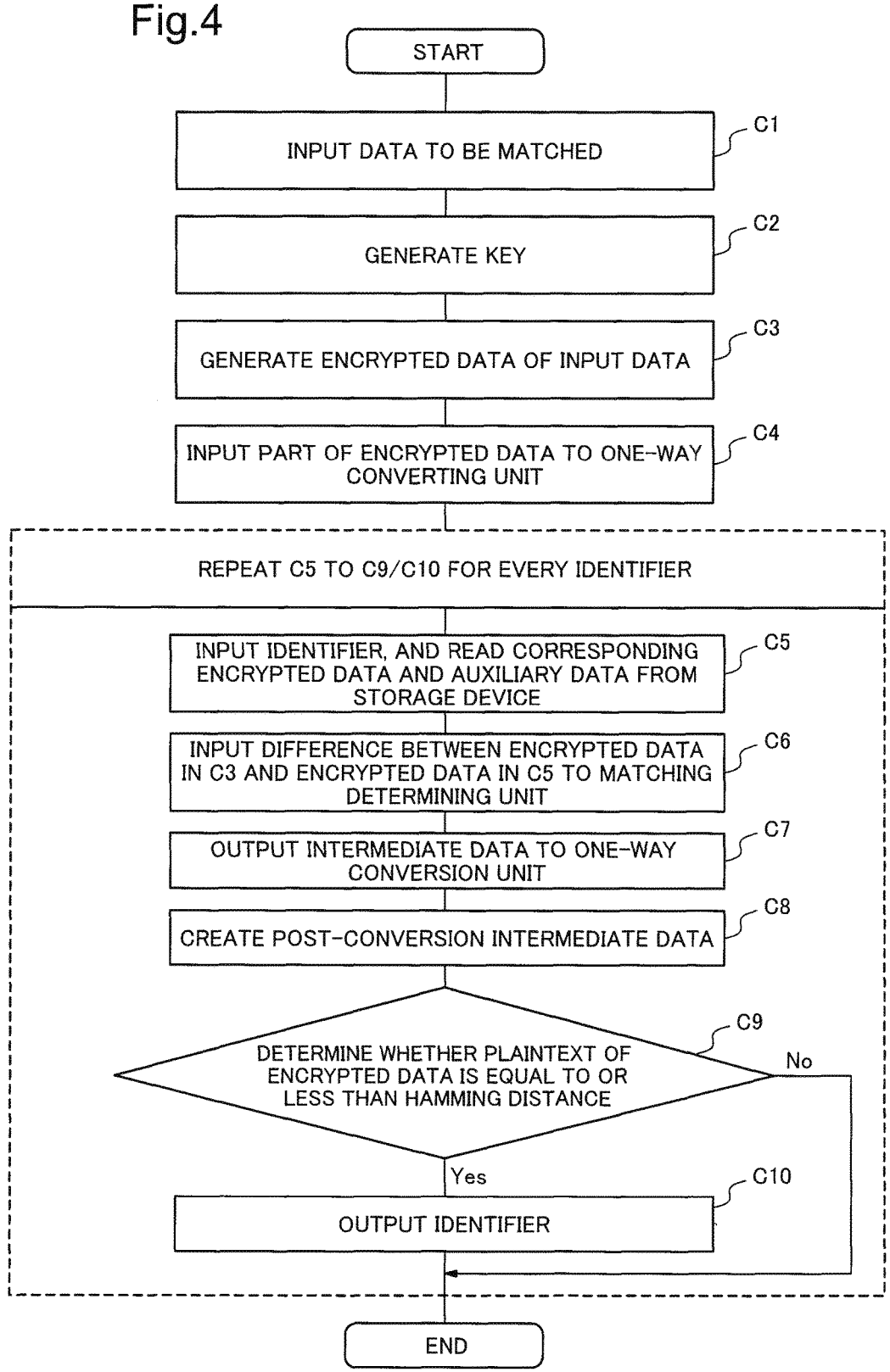
FIG. 4 is an explanatory diagram describing an encrypted text matching phase according to the exemplary embodiment 2 of the present invention.
Figure 5:
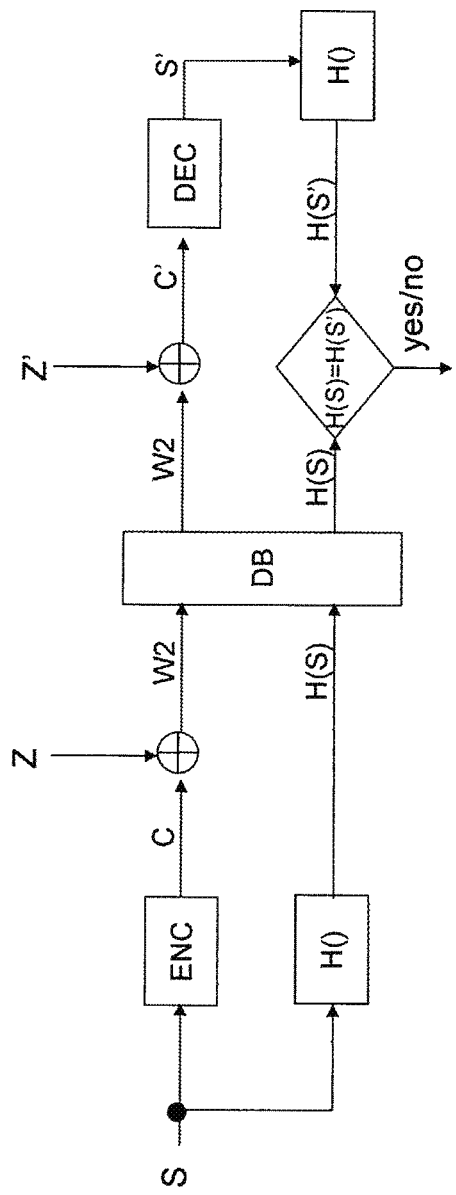
FIG. 5 is a diagram illustrating an example method according to NPL 1.

In the encrypted text matching phase, first, the input data is input to the encrypting unit in the data concealing device 300 (Step C1 in FIG. 4).

Next, the key generating unit 302 in the data concealing device 300 generates a key to be used for concealing the input data and outputs the key to the encrypting unit 301 and to the auxiliary data generating unit 303 (Step C2 in FIG. 4).

Then, the encrypting unit 301 in the data concealing device 300 calculates encrypted data that is obtained by encrypting the input data using the input data in Step C1 and the key in Step C2, and then inputs the encrypted data into the encrypted text subtracting unit 502 in the data matching device 500 (Step C3 in FIG. 4).

Next, the auxiliary data generating unit 303 in the data concealing device 300 inputs part of the auxiliary data (encrypted data) to the one-way converting unit 304 (Step C4 in FIG. 4).

Then, an identifier is input from the all data requesting unit 501 in the data matching device 500 to the identifier managing unit 201. The encrypted data corresponding to the input identifier is input from the encrypted text storage unit 202 in the storage device 200 to the encrypted text subtracting unit 502 in the data matching device 500. In addition, the auxiliary data corresponding to the input identifier is input from the auxiliary data storage unit 203 to the matching determining unit 503 in the data matching device 500 (Step C5 in FIG. 4).

The encrypted text subtracting unit 502 in the data matching device 500, after receiving encrypted texts as inputs from the encrypted text storage unit 202 in the storage device 200 and from the encrypting unit 301 in the data concealing device 300, outputs the difference between the two input pieces of encrypted data to the matching determining unit 503 (Step C5 in FIG. 4).

Next, the auxiliary data from the auxiliary data storage unit 203 and the auxiliary data from the auxiliary data generating unit 303 are input to the matching determining unit 503, through communications in concert between the auxiliary data storage unit 203 in the storage device 200 and the auxiliary data generating unit 303 in the data concealing device 300 under the control of the control unit 504 in the data matching device 500 (Step C6 in FIG. 4).

The matching determining unit 503 in the data matching device 500, which has received, as an input, the difference between two pieces of encrypted data from the encrypted text subtracting unit 502 in the data matching device 500 in Step C5, and has received, as inputs, the post-conversion auxiliary data from the auxiliary data storage unit 203 in the storage device 200 and the auxiliary data from the auxiliary data generating unit 303 in the data concealing device 300 in Step C6, generates intermediate data from the difference between the two pieces of encrypted data and from the auxiliary data, and outputs the intermediate data to the one-way converting unit 506 (Step C7 in FIG. 4).

The one-way converting unit 506 in the data matching device 500 generates post-conversion intermediate data produced through one-way conversion performed on the intermediate data, and outputs the post-conversion intermediate data to the matching determining unit 503 in the data matching device 500 (Step C8 in FIG. 4).

The matching determining unit 503 in the data matching device 500 determines, based on:
the post-conversion intermediate data; and
the auxiliary data,
whether the Hamming distance between the plaintext of the encrypted data that has been input to the encrypted text subtracting unit 502 in the data matching device 500 in Step C3 and the plaintext of the encrypted data that has been input to the encrypted text subtracting unit 502 in the data matching device 500 in Step C5 is equal to or less than a predetermined certain value, and outputs the determination result (Step C9 in FIG. 4).

If the result confirms the matching in Step C9, the identifier outputting unit 505 in the data matching device 500 outputs the identifier that has been input to the identifier managing unit 201 in the storage device 200 in Step C4 (Step C10 in FIG. 4).

The processes from Step C5 to Step C10 are repeated for every identifier (corresponding to encrypted data and auxiliary data) that is stored in the storage device 200 and managed by the identifier managing unit 201 in the storage device 200.

Note that the devices 100, 200, 300, and 500 shown in FIG. 3 may be implemented on a single computer system, or may be configured as individual devices. Alternatively, the units in each of the devices 100, 200, 300, and 500 may be configured in the form of individual devices. Processes handled by individual units in individual devices shown in FIG. 3 may be implemented by a program to be executed by a computer. According to the present invention, a recording medium (semiconductor memory or a magnetic/optical disk) that records such program is provided. The exemplary embodiments are further described below with reference to more specific examples.

EXAMPLE 1

An example 1 of the present invention will be described in detail with reference to FIG. 1. The example 1 is a specific example of the exemplary embodiment 1.

In the data registration phase, first, an N-bit binary string Z is input to the encrypting unit 101 in the registration data generating device 100.

Then, the key generating unit 102 in the registration data generating device 100 generates a key (a K-bit random number) S and outputs the key to the encrypting unit 101 and to the registration auxiliary data generating unit 103.

Next, the encrypting unit 101 calculates N-bit encrypted data W1, which is obtained by calculating an exclusive OR between an N-bit code word C obtained by encoding the input K-bit key S with a binary BCH code, and the N-bit input data Z (the following equation (1)), and then stores the encrypted data into the encrypted text storage unit 202 in the storage device 200.

$$W1 = C(+)Z \quad (1)$$

In the above equation, (+) represents a bitwise exclusive OR. It is assumed that the binary BCH code used here is a code that inputs K-bit data and outputs N-bit data (where N>K) and guarantees that a Hamming distance between any different code words is at least d.

Next, the input data Z, the key S, and the encrypted data W1 are input to the registration auxiliary data generating unit 103, which in turn calculates auxiliary data W2 in accordance with the following equation (2).

$$W2=(c,S)(+)h(W1,R) \quad (2)$$

In the above equation (2),
c is a K-bit constant;
R is an N-bit random number (data less likely to be used repeatedly);
(c, S) represents an inner product, that is, (A, B) represents an inner product of A and B, where two pieces of K=(m*k)-bit data A and B are regarded as vectors into which A and B are divided in units of k bits (it is assumed that the calculation is performed on a Galois extension field GF ($2^k$));
(+) represents a bitwise exclusive OR; and
h is a cryptographic hash function which generates k-bit output data (for example, SHA-256).
H(x, y, z) is defined here as a function represented by the following equation (3).

$$H(x,y,z)=(c,x)(+)h(y,z) \quad (3)$$

H(x, y, z) satisfies the following equation (4).

$$H(a1,b1,c1)(+)H(a2,b2,c2)=H(a1(+)a2,b1,c1)(+)h(b2,c2) \quad (4)$$

In addition, for a random number r of (K−k) bits, letting C3 be the code word data that is obtained through error-correcting coding with a BCH code applied to:

$$h(W1,N)\|r \quad (5)$$

(where $\|$ is an operation symbol representing concatenation of bits), the registration auxiliary data generating unit 103 calculates auxiliary data W3 from C3 and N-bit input data Z in accordance with the following equation (6).

$$W3=C3(+)Z \quad (6)$$

The registration auxiliary data generating unit 103 registers, as auxiliary data, the pair (W2, W3) as obtained in accordance with the above equations (2) and (6) with the auxiliary data storage unit 203.

When the above operations are completed, the input data in the storage device 200 can be assigned a unique identifier by the identifier managing unit 201 and can be later retrieved with the assigned identifier.

The encrypted data W1, the auxiliary data W2, and the auxiliary data W3, which are associated with an identifier i, are hereinafter denoted as W1[i], W2[i], and W3[i], respectively.

In the encrypted text matching phase, first, an identifier i is input to the identifier holding unit 401 in the specified data matching device 400. The encrypted data W1[i] corresponding to the input identifier i is read from the encrypted text storage unit 202 in the storage device 200 and is input to the encrypted text subtracting unit 402 in the specified data matching device 400. In addition, the auxiliary data W2[i] and the auxiliary data W3[i] corresponding to input identifier i are read from the auxiliary data storage unit 203 in the storage device 200 and are input to the matching determining unit 403 in the specified data matching device 400.

Next, N-bit binary string input data Z' (data to be matched) is input to the encrypting unit 301 in the data concealing device 300.

Next, the key generating unit 302 in the data concealing device 300 generates a key (a K-bit random number) S' to be used for concealing the input data Z', and outputs the key to the encrypting unit 301 and to the auxiliary data generating unit 303.

The encrypting unit 301 in the data concealing device 300 calculates encrypted data W1', which is obtained by calculating an exclusive OR between the code word C', which is obtained through error-correcting coding with a binary BCH code applied to the key S' as input from the key generating unit 302, and the input data Z' (refer to the following equation (7)).

$$W1'=C'(+)Z' \quad (7)$$

The encrypting unit 301 in the data concealing device 300 inputs the encrypted data W1' into the encrypted text subtracting unit 402 in the specified data matching device 400.

The encrypted text subtracting unit 402 in the specified data matching device 400 receives, as inputs, the encrypted data W1' from the encrypting unit 301 in the data concealing device 300 and the encrypted data W1[i] corresponding to the identifier i from the encrypted text storage unit 202 in the storage device 200, and then calculates the difference (exclusive OR) between the two pieces of input encrypted data W1' and W1[i] (refer to the following expression (8)).

$$W1'(+)W[i] \quad (8)$$

The encrypted text subtracting unit 402 in the specified data matching device 400 supplies the difference between the two pieces of encrypted data W1'(+) W[i] to the matching determining unit 403.

Next, for a random number ns and an element (generator) g of a predetermined group G, the control unit 404 in the specified data matching device 400 calculates the following:

$$g\_s=g**ns \quad (9)$$

In the equation (9), gns represents the ns-th power of g on the group G ( is an exponentiation operator). Note that a group means a set with a binary operation · that abides by the following rules:
1. Associative law ((a·b)·c=a·(b·c) for ∀a, b, c∈G)
2. Existence of identity element (a·e=e·a=a for ∃e∈G, ∀a∈G)
3. Existence of inverse element (∃b∈G, a·b=b·a=e for ∀a∈G)

The group G is a cyclic group with respect to multiplication and is constituted of a multiplicative group Zp (=Z/pZ) of order p with a prime number p, and a value of g**ns is given by a remainder (mod p) of modulo a prime number p.

The control unit 404 in the specified data matching device 400 outputs W3[i] and g_s to the auxiliary data generating unit 303 in the data concealing device 300.

Next, the auxiliary data generating unit 303 in the data concealing device 300 applies the decrypting process of the binary BCH code to the value obtained by calculating an exclusive OR between W3[i] and the input data Z' (the following expression (10)) to obtain h', which is the decryption result.

$$W3[i](+)Z' \quad (10)$$

The auxiliary data generating unit 303 in the data concealing device 300 calculates W2' and g_c, from the key S', the encrypted data W1', the decryption result h', and g, g_s in the equation (9), and the random number nc, based on the following equations (11a) and (11b), and in cooperation with the one-way converting unit 304, and then outputs the calculated values to the matching determining unit 403 in the specified data matching device 400.

$$W2'=h(H(S',W1',g\_s**nc)(+)h') \tag{11a}$$

$$g\_c=*nc \tag{11b}$$

Next, the matching determining unit 403 in the specified data matching device 400 applies the decrypting process of the binary BCH code to the difference between two pieces of encrypted input data W1' and W[i] (the following expression (12)) to calculate T, which is a result of decrypting the difference between the two pieces of encrypted data W1' and W[i].

$$W1'(+)W[i] \tag{12}$$

The one-way converting unit 405 in the specified data matching device 400 calculates a cryptographic hash function, h, in accordance with the expression (13) on the calculation result of an exclusive OR operation:

$$H(T,W1',g\_c**ns)(+)W2[i]$$

between H(T, W1', g_cns), which is a result of calculating H in the equation (3) by using T, which is a result of decrypting the difference between two pieces of encrypted data W1' and W[i] as calculated by the matching determining unit 403, W1' (the equation (7)), and g_cns (where g_c is the equation (11b) and ns is the random number in the equation (9)), and W2[i], which is read from the auxiliary data storage unit 203.

$$h(H(T,W1',g\_c**ns)(+)W2[i]) \tag{13}$$

Then, the matching determining unit 403 in the specified data matching device 400 checks whether the hash value as calculated in accordance with the above expression (13) is equal to the auxiliary data W2', which has been input from the auxiliary data generating unit 303 in the data concealing device 300; in other words it checks whether the following equation (14) is satisfied.

$$W2'=h(H(T,W1,g\_c**ns)(+)W2[i]) \tag{14}$$

The matching determining unit 403 in the specified data matching device 400 outputs a determination result by determining that the Hamming distance between the original input data (plaintext) Z of W1[i] and the input data to be matched (plaintext) Z' is equal to or less than d if the equation (14) is satisfied, or by determining that the Hamming distance between the original input data (plaintext) Z of W1[i] and the input data to be matched (plaintext) Z' exceeds d if the equation (14) is not satisfied. Note that the above-described BCH coding assumes that a Hamming distance between any different code words exceeds at least d.

Both of the matching determining unit 403 in the specified data matching device 400 and the auxiliary data generating unit 303 in the data concealing device 300 may be configured to generate g_snc (=(gns)nc)(=R') in the auxiliary data W2'=h(H(S', W1', g_snc)(+) h'), which is generated by the auxiliary data generating unit 303 in the data concealing device 300; and g_cns (=(gnc)ns) in the matching determining unit 403 in the specified data matching device 400**, through the use of, for example, the known Diffie-Hellman key exchange method.

EXAMPLE 2

An example 2 will be described in detail with reference to FIG. 3. The example 2 is a specific example of the exemplary embodiment 2.

In the data registration phase, first, an N-bit binary string Z is input to the encrypting unit 101 in the registration data generating device 100.

Then, the key generating unit 102 in the registration data generating device 100 generates a K-bit random number S and outputs the number to the encrypting unit 101 and to the registration auxiliary data generating unit 103.

Next, the encrypting unit 101 calculates encrypted data W1, which is obtained by calculating an exclusive OR between a code word C obtained by encoding the input key S with a binary BCH code, and the input data Z, and then stores the encrypted data into the encrypted text storage unit 202. It is assumed that the binary BCH code used here is a code that inputs K-bit data and outputs N-bit data and guarantees that a Hamming distance between any different code words is at least d.

Next, the input data Z, the key S, and the encrypted data W1 are input to the registration auxiliary data generating unit 103. The registration auxiliary data generating unit 103 calculates W2 in accordance with the following equation (15).

$$W2=(c,S)(+)h(W1,R) \tag{15}$$

In the above equation (15), c is a K-bit constant;

R is a random number (data less likely to be used repeatedly);

(A, B) is an inner product of A and B, where two pieces of K=(m*k)-bit data A and B are regarded as vectors into which A and B are divided in units of k bits (it is assumed that the calculation is performed on a Galois extension field GF ($2^k$));

(+) represents a bitwise exclusive OR; and h is a cryptographic hash function which generates k-bit output data (for example, SHA-256).

H(x, y, z) is defined as a function represented by the equation (16) (the same as the equation (3) above).

$$H(x,y,z)=(c,x)(+)h(y,z) \tag{16}$$

For a random number r of K−k bits, letting C3 be the code word data that is obtained by encoding:

$$h(W1,N)\|r \tag{17}$$

(where ∥ is an operation symbol representing concatenation of bits) with a BCH code, the registration auxiliary data generating unit 103 calculates W3 from C3 and Z in accordance with the following equation:

$$W3=C3(+)Z \tag{18}$$

The registration auxiliary data generating unit 103 registers, as auxiliary data, the pair (W2, W3) as generated above with the auxiliary data storage unit 203.

When the above operations are completed, the input data in the storage device 200 can be assigned a unique identifier by the identifier managing unit 201 and can be later retrieved with the assigned identifier. W1, W2, and W3, which are associated with an identifier i, are hereinafter denoted as W1[i], W2[i], and W3[i], respectively.

In the encrypted text matching phase, first, the input data Z' (data to be matched) is input to the encrypting unit 301 in the data concealing device 300.

Next, the key generating unit 302 in the data concealing device 300 generates a key S' (a K-bit random number) to be used for concealing the input data Z', and outputs the key to the encrypting unit 301 and to the auxiliary data generating unit 303.

The encrypting unit 301 in the data concealing device 300 calculates encrypted data W1' (the following equation (19)), which is obtained by calculating an exclusive OR between a code word C', which is obtained by encoding the input key S' with a binary BCH code, and the input data Z', and then stores the encrypted data in the encrypted text subtracting unit 502 in the data matching device 500.

$$W1'=C'(+)Z' \qquad (19)$$

Next, the all data requesting unit 501 in the data matching device 500 inputs an identifier i to the identifier managing unit 201 in the storage device 200. The encrypted data W1[i] corresponding to the input identifier i is read from the encrypted text storage unit 202 in the storage device 200 and is input to the encrypted text subtracting unit 502 in the data matching device 500. In addition, the auxiliary data W2[i] and the auxiliary data W3[i] corresponding to the identifier i are read from the auxiliary data storage unit 203 in the storage device 200, and then input to the matching determining unit 503 in the data matching device 500.

The encrypted text subtracting unit 502 in the data matching device 500 receives:

the encrypted data W1[i] from the encrypted text storage unit 202 in the storage device 200; and the encrypted data W1' from the data concealing device 300, as inputs, and outputs the difference between the two pieces of the input encrypted data W1' and W1[i] (exclusive OR) (the following expression (20)) to the matching determining unit 503.

$$W1'(+)W1[i] \qquad (20)$$

Next, for a random number ns and an element g of a predetermined group G, the control unit 504 in the data matching device 500 calculates the following:

$$g\_s = g^{**}ns \qquad (21)$$

and outputs the result to the auxiliary data generating unit 303.

Next, the auxiliary data generating unit 303 in the data concealing device 300 randomly selects S1' and S2', which satisfy:

$$S'=S1'(+)S2' \qquad (22)$$

In cooperation with the one-way converting unit 304, the auxiliary data generating unit 303 in the data concealing device 300 calculates W2' and g_c based on the following equations (23a) and (23b).

$$W2'=h(H(S1',W1',g\_s^{**}nc)) \qquad (23a)$$

$$g\_c = g^{**}nc \qquad (23b)$$

Next, from C3, which is obtained through binary BCH error-correcting coding applied to the data concealing from concatenation of bits on an inner product (c, S2') and a random number r':

$$(c,S2')\|r' \qquad (24)$$

and from Z', the auxiliary data generating unit 303 in the data concealing device 300 calculates W3' in accordance with the following equation:

$$W3'=C3(+)Z' \qquad (25)$$

and outputs W1', W2', W3' and g_c to the matching determining unit 503 in the data matching device 500.

Next, the matching determining unit 503 in the data matching device 500 applies the decrypting process of the binary BCH code to the difference between two pieces of input encrypted data:

$$W1'(+)W1[i] \qquad (26)$$

to calculate T, which is a result of decrypting the difference between the two pieces of encrypted data W1' and W1[i].

In addition, the matching determining unit 503 in the data matching device 500 applies the decrypting process of the binary BCH code to the exclusive OR between W3[i] and W3':

$$W3[i](+)W3' \qquad (27)$$

to calculate w3, which is a result of decrypting W3[i](+)W3'.

The matching determining unit 503 in the data matching device 500 outputs to the one-way converting unit 506 the result H(T, W1', g_cns), which is calculated in accordance with the equation (16) by using T, which is a result of decrypting the difference between two pieces of encrypted data, and W1' and g_cns, as well as outputting W2[i] and w3 to the one-way converting unit 506.

The one-way converting unit 506 in the data matching device 500 calculates a hash value (the following expression (28)) of the result of a bitwise exclusive OR among H(T, W1', g_c**ns), W2[i], and w3:

$$H(T,W1',g\_c^{**}ns)(+)W2[i](+)w3$$

as calculated on H(T, W1', g_cns), which is obtained through calculation using T, which is a result of decrypting the difference between two pieces of encrypted data, and W1' and g_cns.

$$h(H(T,W1',g\_c^{**}ns)(+)W2[i](+)w3) \qquad (28)$$

The matching determining unit 503 in the data matching device 500 checks whether the hash value calculated by the one-way converting unit 506 in accordance with the above expression (28) is equal to W2' (equation (23a)); in other words it checks whether the equation (29) is satisfied.

$$W2'=h(H(T,W1',g\_c^{**}ns)(+)W2[i](+)w3) \qquad (29)$$

If the above equation (29) is satisfied, the identifier outputting unit 505 in the data matching device 500 determines that the Hamming distance between the original data of W1[i] and Z' is equal to or less than d and outputs the identifier i. If the above equation (29) is not satisfied, the identifier outputting unit 505 in the data matching device 500 determines that the Hamming distance exceeds d and thus does not output the identifier i.

The above operations are repeated on every identifier i, which is managed by the storage device, to output every identifier for any original data whose Hamming distance to the input data Z' is equal to or less than d.

Similarly to the example 1, in the example 2, both of the matching determining unit 503 in the data matching device 500 and the auxiliary data generating unit 303 in the data concealing device 300 may be configured to generate g_snc (=(gns)nc) in the auxiliary data W2'=h(H(S1', W1', g_snc)), which is generated by the auxiliary data generating unit 303 in the data concealing device 300 and g_cns (=(gnc)**ns) in the matching determining unit 503 in the data matching device 500, through the use of, for example, the known Diffie-Hellman key exchange method.

Example applications of the example 1 or 2 include authentication where biometric information is protected. The following outlines such authentication.

The input data in the data registration phase and the input data in the encrypted text matching phase may be biometric information obtained from fingerprints, veins, or the like. In this case, while the biometric information remains concealed (encrypted), it can be determined whether the encrypted biometric data stored in the storage device and the encrypted biometric data transmitted from the data concealing device have been taken from the same person, depending on whether the Hamming distance between the two pieces of input data is equal to or less than a predetermined certain value, thereby achieving authentication. Concerning biometric information, the same data may not always be obtained steadily. However, it can be assumed that pieces of data obtained from the same person are similar to one another (a Hamming distance between two pieces of such data is small). Therefore, the present invention is regarded as suitable for application to, for example, biometric authentication (however, it should be noted that the application is not limited to biometric authentication).

The respective disclosures of the patent and non-patent literatures described above are incorporated herein by reference. Modifications and adjustments of exemplary embodiments and examples may be made within the bounds of the entire disclosure (including the scope of the claims) of the present invention, and also based on fundamental technological concepts thereof. Furthermore, various combinations and selections of various disclosed elements (including respective elements of the respective claims, respective elements of the respective examples, respective elements of the respective drawings, and the like) are possible within the bounds of the claims of the present invention. That is, the present invention clearly includes every type of transformation and modification that a person skilled in the art can realize according to the entire disclosure of the present invention including the claims and to technological concepts thereof.

REFERENCE SIGNS LIST

10 Encrypted text matching system (device)
11, 12 Encrypting means (unit)
13 Storage device
14 Auxiliary data generating means (unit)
14h, 15h One-way converting means (unit)
15 Matching determining means (unit)
100 Registration data generating device
101 Encrypting unit
102 Key generating unit
103 Registration auxiliary data generating unit
104 One-way converting unit
200 Storage device
201 Identifier managing unit
202 Encrypted text storage unit
203 Auxiliary data storage unit
300 Data concealing device
301 Encrypting unit
302 Key generating unit
303 Auxiliary data generating unit
304 One-way converting unit
400 Specified data matching device
401 Identifier holding unit
402 Encrypted text subtracting unit
403 Matching determining unit
404 Control unit
405 One-way converting unit
500 Data matching device
501 All data requesting unit
502 Encrypted text subtracting unit
503 Matching determining unit
504 Control unit
505 Identifier outputting unit
506 One-way converting unit

What is claimed is:

1. An encrypted text matching system comprising:
a memory storing instructions;
at least one processor configured to process the instructions to:
generate first auxiliary data and second auxiliary data, respectively, which are for verification of matching between a first encrypted text that is obtained by encrypting input data and is registered with a storage device and a second encrypted text that is obtained by encrypting input data to be matched, the verification being performed by using a Hamming distance between plaintexts; and
perform one-way conversion on at least part of the second auxiliary data, perform one-way conversion on intermediate data that is generated based on a difference between the first encrypted text and the second encrypted text and on the first auxiliary data, and determine, by using a result of the one-way conversion performed on the intermediate data as well as using the second auxiliary data that underwent the one-way conversion, whether a Hamming distance between plaintexts is equal to or less than a predetermined certain value, the Hamming distance corresponding to the difference between the first encrypted text and the second encrypted text;
a registration data generating device;
a storage device;
a data concealing device; and
a specified data matching device,
wherein the registration data generating device comprises a second memory storing second instructions, and at least one second processor configured to process the second instructions to:
receive fixed-length input data and a key, as inputs, and outputs an encrypted text that is obtained by encrypting the input data with the key,
the encrypted text satisfying a relationship where the sum of an encrypted text 1 obtained by encrypting a plaintext 1 with a key 1 and an encrypted text 2 obtained by encrypting a plaintext 2 with a key 2 is equal to an encrypted text obtained by encrypting the sum of the plaintext 1 and the plaintext 2 with the sum of the key 1 and the key 2;
generate the key; and
receive the input data and the key, as inputs, and output the first auxiliary data for verifying that a Hamming distance between a plaintext of the first encrypted text and a plaintext of the second encrypted text output from the data concealing device is equal to or less than a predetermined certain value,
and wherein the storage device comprises a third memory storing third instructions and at least one third processor configured to process the third instructions to:
store one or more of the encrypted texts output from the registration data generating device;
store one or more pieces of the auxiliary data output from the registration data generating device; and
receive an identifier, as an input, from the specified data matching device and cause output of the encrypted text and the first auxiliary data that correspond to the identifier, respectively, and wherein the data concealing device comprises a fourth memory storing fourth instructions and at least one fourth processor configured to process the fourth instructions to:

receive fixed-length input data and a key, as inputs, and output an encrypted text that is obtained by encrypting the input data with the key, the encrypted text satisfying a relationship where the sum of an encrypted text 1 obtained by encrypting a plaintext 1 with a key 1 and an encrypted text 2 obtained by encrypting a plaintext 2 with a key 2 is equal to an encrypted text obtained by encrypting the sum of the plaintext 1 and the plaintext 2 with the sum of the key 1 and the key 2;

generate the key;

receive the input data and the key, as inputs, and output the second auxiliary data for verifying that a Hamming distance between a plaintext of the second encrypted text and a plaintext of the first encrypted text output from the registration data generating device is equal to or less than a predetermined certain value; and output data obtained through one-way conversion on at least part of the second auxiliary data, and wherein the specified data matching device comprises a fifth memory storing fifth instructions and at least one fifth processor configured to process the fifth instructions to:

receive an identifier, as an input, output the identifier to the storage device, and instruct output of the encrypted text and the auxiliary data that correspond to the identifier;

receive the first encrypted text output from the data concealing device and the encrypted text read from the storage device, as inputs, and outputs a difference between the input two encrypted texts;

receive:

the difference between the first and second encrypted texts;

the first auxiliary data read from the storage device; and the second auxiliary data output from the data concealing device, as inputs, transmit intermediate data which is generated based on the difference between the first and second encrypted texts and on the first auxiliary data read from the storage device, and determine whether a Hamming distance between plaintexts corresponding to the difference between the first and second encrypted texts is equal to or less than a predetermined certain value, by determining whether post-one-way conversion data generated based on the intermediate data is equal to one piece of the second auxiliary data that underwent one-way conversion and is output from the data concealing device;

receive, as an input, the intermediate data and output a result of one-way conversion performed on the intermediate data; and control data exchanges between the data concealing device and the specified data matching device.

2. The encrypted text matching system according to claim 1, wherein the encrypted text is a result of an exclusive OR operation between a code word, which is obtained by encoding a key for encrypting the plaintext of the input data with an error-correcting code having linearity, and the plaintext, and wherein the system calculates each of the first auxiliary data and the second auxiliary data that are related to the encrypted text registered with the storage device and the encrypted text of the input data to be matched, respectively, based on a result of one-way conversion on an exclusive OR between an inner product of the corresponding key and a constant, and an output of a cryptographic hash function for a bit string that is based on the corresponding encrypted text.

3. The encrypted text matching system according to claim 1, wherein, for the key and the plaintext of the input data, the key is encoded with an error-correcting code having linearity and outputs, as the encrypted text, a result of calculating a vectorial sum of a code word, which is an encoded result of error-correcting coding, and the plaintext.

4. The encrypted text matching system according to claim 1, wherein the first auxiliary data comprises data that is calculated according to the following equation:

letting S be a key that is input to the registration data generating device;

letting W1 be an encrypted text that is output; and letting R be data that is less likely to be repeatedly used, $$(c,S)(+)h(W1,R)$$

(where c is a constant; (x, y) represents an inner product of vectors x and y, and (c, S) is an inner product of c and S; h is a cryptographic hash function; and (+) represents a bitwise exclusive OR), and wherein the second auxiliary data output from the data concealing device comprises data that is calculated according to the following equation:

letting S' be a key that is input to the data concealing device;

letting W1' be an encrypted text that is output; and letting R' be data that is less likely to be repeatedly used, $$(c,S')(+)h(W1',R').$$

5. The encrypted text matching system according to claim 4, wherein the R' is generated by both of the specified data matching device or in the data matching device and the data concealing device through the use of a Diffie-Hellman key exchange method.

6. A biometric authentication system comprising the encrypted text matching system according to claim 1, wherein biometric authentication is performed by generating, based on biometric information, input data to be input to the registration data generating device and to the data concealing device, and by determining whether data input to the specified data matching device or the data matching device via the data concealing device matches data stored in the storage device.

7. A method for matching encrypted texts, comprising:

generating first auxiliary data and second auxiliary data, respectively, which are for verification of matching between a first encrypted text that is obtained by encrypting input data and is registered with a storage device and a second encrypted text that is obtained by encrypting input data to be matched, the verification being performed by using a Hamming distance between plaintexts;

performing one-way conversion on at least part of the second auxiliary data, performing one-way conversion on intermediate data that is generated based on a difference between the first encrypted text and the second encrypted text and on the first auxiliary data, and determining, by using a result of the one-way conversion performed on the intermediate data as well as using the second auxiliary data that underwent the one-way conversion, whether a Hamming distance between plaintexts is equal to or less than a predetermined certain value, the Hamming distance corresponding to the difference between the first encrypted text and the second encrypted text;

receiving fixed-length input data and a key, as inputs, and outputting an encrypted text that is obtained by encrypting the input data with the key, the encrypted text satisfying a relationship where the sum of an encrypted text 1 obtained by encrypting a plaintext 1 with a key 1 and an encrypted text 2 obtained by encrypting a plaintext 2 with a key 2 is equal to an encrypted text obtained by encrypting the sum of the plaintext 1 and the plaintext 2 with the sum of the key 1 and the key 2;

generating the key; and receiving the input data and the key, as inputs, and outputting the first auxiliary data for verifying that a Hamming distance between a plaintext of the first encrypted text and a plaintext of the second encrypted text is equal to or less than a predetermined certain value, storing one or more of the encrypted texts;

storing one or more pieces of the auxiliary data; and receiving an identifier, as an input, and causing output of the encrypted text and the first auxiliary data that correspond to the identifier, respectively, receiving fixed-length input data and a key, as inputs, and outputting an encrypted text that is obtained by encrypting the input data with the key, the encrypted text satisfying a relationship where the sum of an encrypted text 1 obtained by encrypting a plaintext 1 with a key 1 and an encrypted text 2 obtained by encrypting a plaintext 2 with a key 2 is equal to an encrypted text obtained by encrypting the sum of the plaintext 1 and the plaintext 2 with the sum of the key 1 and the key 2;

generating the key;

receiving the input data and the key, as inputs, and outputting the second auxiliary data for verifying that a Hamming distance between a plaintext of the second encrypted text and a plaintext of the first encrypted text is equal to or less than a predetermined certain value; and outputting data obtained through one-way conversion on at least part of the second auxiliary data, receiving an identifier, as an input, output the identifier, and instructing output of the encrypted text and the auxiliary data that correspond to the identifier;

receiving the first encrypted text and the encrypted text, as inputs, and outputting a difference between the input two encrypted texts;

receiving:

the difference between the first and second encrypted texts;

the first auxiliary data; and the second auxiliary data, as inputs, transmitting intermediate data which is generated based on the difference between the first and second encrypted texts and on the first auxiliary data read from the storage device, and determining whether a Hamming distance between plaintexts corresponding to the difference between the first and second encrypted texts is equal to or less than a predetermined certain value, by determining whether post-one-way conversion data generated based on the intermediate data is equal to one piece of the second auxiliary data that underwent one-way conversion;

receiving, as an input, the intermediate data and outputting a result of one-way conversion performed on the intermediate data; and controlling data exchanges.

8. A non-transitory computer readable medium storing a program causing a computer to execute processes to:

generate first auxiliary data and second auxiliary data, respectively, which are for verification of matching between a first encrypted text that is obtained by encrypting input data and is registered with a storage device and a second encrypted text that is obtained by encrypting input data to be matched, the verification being performed by using a Hamming distance between plaintexts;

which perform one-way conversion on at least part of the second auxiliary data, performs one-way conversion on intermediate data that is generated based on a difference between the first encrypted text and the second encrypted text and on the first auxiliary data, and determines, by using a result of the one-way conversion performed on the intermediate data as well as using the second auxiliary data that underwent the one-way conversion, whether a Hamming distance between plaintexts is equal to or less than a predetermined certain value, the Hamming distance corresponding to the difference between the first encrypted text and the second encrypted text;

receive fixed-length input data and a key, as inputs, and output an encrypted text that is obtained by encrypting the input data with the key, the encrypted text satisfying a relationship where the sum of an encrypted text 1 obtained by encrypting a plaintext 1 with a key 1 and an encrypted text 2 obtained by encrypting a plaintext 2 with a key 2 is equal to an encrypted text obtained by encrypting the sum of the plaintext 1 and the plaintext 2 with the sum of the key 1 and the key 2;

generate the key; and receive the input data and the key, as inputs, and output the first auxiliary data for verifying that a Hamming distance between a plaintext of the first encrypted text and a plaintext of the second encrypted text is equal to or less than a predetermined certain value, store one or more of the encrypted texts;

store one or more pieces of the auxiliary data; and receive an identifier, as an input, and cause output of the encrypted text and the first auxiliary data that correspond to the identifier, respectively, receive fixed-length input data and a key, as inputs, and output an encrypted text that is obtained by encrypting the input data with the key, the encrypted text satisfying a relationship where the sum of an encrypted text 1 obtained by encrypting a plaintext 1 with a key 1 and an encrypted text 2 obtained by encrypting a plaintext 2 with a key 2 is equal to an encrypted text obtained by encrypting the sum of the plaintext 1 and the plaintext 2 with the sum of the key 1 and the key 2;

generate the key;

receive the input data and the key, as inputs, and output the second auxiliary data for verifying that a Hamming distance between a plaintext of the second encrypted text and a plaintext of the first encrypted text is equal to or less than a predetermined certain value; and output data obtained through one-way conversion on at least part of the second auxiliary data, receive an identifier, as an input, output the identifier, and instruct output of the encrypted text and the auxiliary data that correspond to the identifier;

receive the first encrypted text and the encrypted text, as inputs, and output a difference between the input two encrypted texts;

receive:

the difference between the first and second encrypted texts;

the first auxiliary data; and the second auxiliary data, as inputs, transmit intermediate data which is generated based on the difference between the first and second encrypted texts and on the first auxiliary data read from the storage device, and determine whether a Hamming distance between plaintexts corresponding to the difference between the first and second encrypted texts is equal to or less than a predetermined certain value, by determining whether post-one-way conversion data generated based on the intermediate data is equal to one piece of the second auxiliary data that underwent one-way conversion;

receive, as an input, the intermediate data and output a result of one-way conversion performed on the intermediate data; and control data exchanges.

* * * * *